United States Patent
Compton

(10) Patent No.: US 10,911,473 B2
(45) Date of Patent: Feb. 2, 2021

(54) DISTRIBUTED DENIAL-OF-SERVICE ATTACK DETECTION AND MITIGATION BASED ON AUTONOMOUS SYSTEM NUMBER

(71) Applicant: Charter Communications Operating, LLC, St. Louis, MO (US)

(72) Inventor: Richard A. Compton, Highlands Ranch, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 283 days.

(21) Appl. No.: 15/692,762

(22) Filed: Aug. 31, 2017

(65) Prior Publication Data

US 2019/0068624 A1   Feb. 28, 2019

(51) Int. Cl.
*H04L 29/06* (2006.01)

(52) U.S. Cl.
CPC .......... *H04L 63/1425* (2013.01); *H04L 29/06* (2013.01); *H04L 63/1408* (2013.01); *H04L 63/1433* (2013.01); *H04L 63/1441* (2013.01); *H04L 63/1458* (2013.01); *H04L 69/22* (2013.01)

(58) Field of Classification Search
CPC . H04L 63/1425; H04L 29/06; H04L 63/1433; H04L 63/1458; H04L 69/22; H04L 63/1408; H04L 63/1441
See application file for complete search history.

(56) References Cited

U.S. PATENT DOCUMENTS

| | | |
|---|---|---|
| 7,788,718 B1 | 8/2010 | Fei et al. |
| 10,044,736 B1 * | 8/2018 | Barger ................. H04L 63/14 |
| 2003/0145232 A1 | 7/2003 | Poletto et al. |
| 2006/0272018 A1 | 11/2006 | Fouant |
| 2011/0191847 A1 * | 8/2011 | Davis .................. G06F 15/16 726/22 |

(Continued)

OTHER PUBLICATIONS

Steve Hutchinson, Robert F. Erbacher, "ASN reputation system model," Proc. SPIE 9458, Cyber Sensing 2015, 94580A (May 14, 2015) (Year: 2015).*

(Continued)

*Primary Examiner* — Theodore C Parsons
(74) *Attorney, Agent, or Firm* — Otterstedt, Wallace & Kammer, LLP

(57) ABSTRACT

An apparatus for detecting a distributed denial-of-service (DDoS) attack in a networked computing system includes at least one detector in operative communication with a corresponding router in the networked computing system. The detector is configured: to receive data packets from the router; to compare a volume of the data packets received by the detector with a threshold value; to obtain an Autonomous System Number (ASN) associated with a source Internet Protocol (IP) address of the received data packets when the volume of the data packets exceeds the threshold value; and to generate an output signal indicative of a probability of a presence of a DDoS attack based at least in part on threat information corresponding to the ASN associated with the source IP address of the received data packets.

20 Claims, 5 Drawing Sheets

(56) References Cited

U.S. PATENT DOCUMENTS

| | | | |
|---|---|---|---|
| 2014/0143825 A1* | 5/2014 | Behrendt | G06F 21/552 |
| | | | 726/1 |
| 2014/0157416 A1* | 6/2014 | Holloway | H04L 63/1466 |
| | | | 726/23 |
| 2015/0207809 A1* | 7/2015 | Macaulay | G06F 21/552 |
| | | | 726/22 |
| 2015/0312273 A1* | 10/2015 | Pappu | H04L 63/1416 |
| | | | 726/23 |
| 2016/0065597 A1 | 3/2016 | Nguyen et al. | |
| 2016/0080415 A1* | 3/2016 | Wu | H04L 63/1491 |
| | | | 726/23 |
| 2016/0099964 A1* | 4/2016 | Htay | H04L 63/1425 |
| | | | 726/23 |
| 2017/0279836 A1* | 9/2017 | Vasseur | H04L 63/1425 |
| 2017/0374097 A1 | 12/2017 | Kish et al. | |
| 2017/0374098 A1 | 12/2017 | Kish et al. | |

OTHER PUBLICATIONS

"Autonomous system (Internet)," Wikipedia, https://en.wikipedia.org/wiki/Autonomous_system_(Internet), pp. 1-3, May 4, 2017.
Geoff Huston, "Exploring Autonomous System Numbers," The Internet Protocol Journal, May 4, 2017, pp. 1-10, vol. 9, No. 1, Cisco.
U.S. Appl. No. 15/692,854, Richard A. Compton, "Distributed Denial-of-Service Attack Detection and Mitigation Based on Autonomous System Number," Aug. 31, 2017, pp. 1-32.

\* cited by examiner

DISTRIBUTED DENIAL-OF-SERVICE ATTACK DETECTION AND MITIGATION BASED ON AUTONOMOUS SYSTEM NUMBER

CROSS-REFERENCE TO RELATED APPLICATIONS

This application is related to the U.S. application Ser. No. 15/692,854, filed on even date herewith, entitled "Distributed Denial-of-Service Attack Detection and Mitigation based on Autonomous System Number," the disclosure of which is incorporated by reference herein in its entirety for all purposes.

FIELD OF THE INVENTION

The present invention relates generally to the electrical, electronic and computer arts, and, more particularly, to detection and mitigation of distributed denial-of-service attacks.

BACKGROUND OF THE INVENTION

In the context of computing, a denial-of-service (DoS) attack is an attempt to make a machine or network resource unavailable to its intended users. A distributed denial-of-service (DDoS) attack is an attack in which multiple compromised computer systems attack a target resource, such as a server, router, firewall, website, or other network resource, and cause a denial of service for users of the targeted resource. A flood of incoming messages, connection requests, malformed packets and the like creates a stream of bogus traffic which, when transmitted to the target system, forces it to slow down or even crash and shut down. Since a server or other network resource can only process a limited number of requests at any given time, if an attacker overloads the target resource with requests, it can't process the requests of its legitimate users, thereby resulting in a "denial of service" because the users are prevented from accessing that resource.

Two common types of DDoS attacks are bandwidth attacks and application attacks. Bandwidth attacks are DDoS attacks which consume resources such as network bandwidth or equipment by overwhelming one or the other (or both) with a high volume of packets. Targeted routers, servers and firewalls, all of which have limited processing capability, can be rendered unavailable to process valid transactions, and can fail under the load. One common form of bandwidth attack is a packet-flooding attack, in which a large number of seemingly legitimate Transmission Control Protocol (TCP), User Datagram Protocol (UDP), Internet Control Message Protocol (ICMP) and/or other protocol IP packets are directed to a target destination, thus filling up the available bandwidth to the target and preventing valid connections from being established. To make detection even more difficult, such attacks might also spoof the source address; that is, misrepresent the Internet Protocol (IP) source address that supposedly generated the request to prevent identification. Application attacks, on the other hand, are DDoS attacks that use the expected behavior of protocols, such as, for example, TCP and Hypertext Transfer Protocol (HTTP), to an attacker's advantage by tying up computational resources and preventing them from processing transactions or requests. HTTP half-open and HTTP error attacks are common examples of application attacks.

Since DDoS attacks are by definition distributed, it can be very difficult to mitigate attack traffic when the attacking source IP addresses are so widespread. Furthermore, a growing trend among DDoS attackers is to use sophisticated spoofing techniques and essential protocols (rather than nonessential protocols that can be blocked) to make DDoS attacks even more stealthy and disruptive. These attacks, which use legitimate application protocols and services, are very difficult to identify and defeat; employing broad packet-filtering or rate-limiting measures simply completes the attacker's desired objective by shutting down the system, causing denial of service to legitimate users.

SUMMARY OF THE INVENTION

The present invention, in one or more embodiments, comprises a method of detecting and mitigating distributed denial-of-service (DDoS) attack traffic, not based solely on source Internet Protocol (IP) address or country, but based at least in part on Autonomous System Number (ASN). In one or more embodiments, a signaling device is provided that is configured to identify the ASNs sending malicious traffic and then communicate to one or more network devices to treat the traffic originating from these ASNs differently. For example, the network devices could be configured to block or rate-limit traffic to the victim IP(s) from these ASNs, or divert traffic from these ASNs to devices that can do further inspection/blocking of only the malicious traffic.

In one aspect, an exemplary apparatus for detecting a DDoS attack in a networked computing system, according to an aspect of the invention, includes at least one detector operatively coupled with a corresponding router in the networked computing system. The detector is configured: to receive data packets from the router; to compare a volume of the data packets received by the detector with a threshold value; to obtain an ASN associated with a source IP address of the received data packets when the volume of the data packets exceeds the threshold value; and to generate an output signal indicative of a probability of a presence of a DDoS attack based at least in part on threat information corresponding to the ASN associated with the source IP address of the received data packets.

In another aspect, an exemplary method of detecting a DDoS attack in a networked computing system includes: receiving data packets from a router in the networked computing system, each of the data packets having a source IP address associated therewith; comparing a volume of the received data packets against a threshold value to determine whether the volume of the received data packets exceeds the threshold value; obtaining an ASN associated with the source IP address of the received data packets when the volume of the received data packets exceeds the threshold value; and generating an output signal indicative of a probability of a presence of a DDoS attack based at least in part on threat information corresponding to the ASN associated with the source IP address of the received data packets.

In yet another aspect, an exemplary non-transitory computer readable medium includes computer executable instructions which when executed by a computer cause the computer to perform a method of: receiving data packets from a router in a networked computing system, each of the data packets having a source IP address associated therewith; comparing a volume of the received data packets against a threshold value to determine whether the volume of the received data packets exceeds the threshold value; obtaining an ASN associated with the source IP address of the received data packets when the volume of the received data packets exceeds the threshold value; and generating an output signal indicative of a probability of a presence of a distributed denial of service attack based at least in part on threat information corresponding to the ASN associated with the source IP address of the received data packets.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an Internet Service Provider (ISP) peering router, data center, DDoS mitigation device, etc.) including memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

enhanced accuracy of information regarding the source of a suspected DDoS attack to thereby reduce the number of false positives during DDoS detection and provide more targeted DDoS mitigation options;

targeted DDoS mitigation actions based on at least the source of detected malicious traffic for alleviating DDoS attacks without adversely impacting the flow of valid traffic in the system;

implementation of the novel DDoS detection and mitigation techniques can be easily integrated with existing system hardware, thereby providing a more robust DDoS detection and mitigation mechanism without significantly increasing system overhead and complexity.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present disclosure will be described herein in the context of apparatus and methods for detecting and mitigating distributed denial-of-service (DDoS) attacks in a networked computing environment. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

As previously stated, DDoS attacks are by definition distributed, and therefore it can be very difficult to accurately detect and mitigate attack traffic when the attacking source IP addresses are so widespread. Furthermore, a growing trend among DDoS attackers is to utilize sophisticated spoofing techniques and essential protocols to make DDoS attacks even more stealthy and disruptive. These attacks, which use legitimate application protocols and services, are very difficult to identify and defeat.

Figure 1:
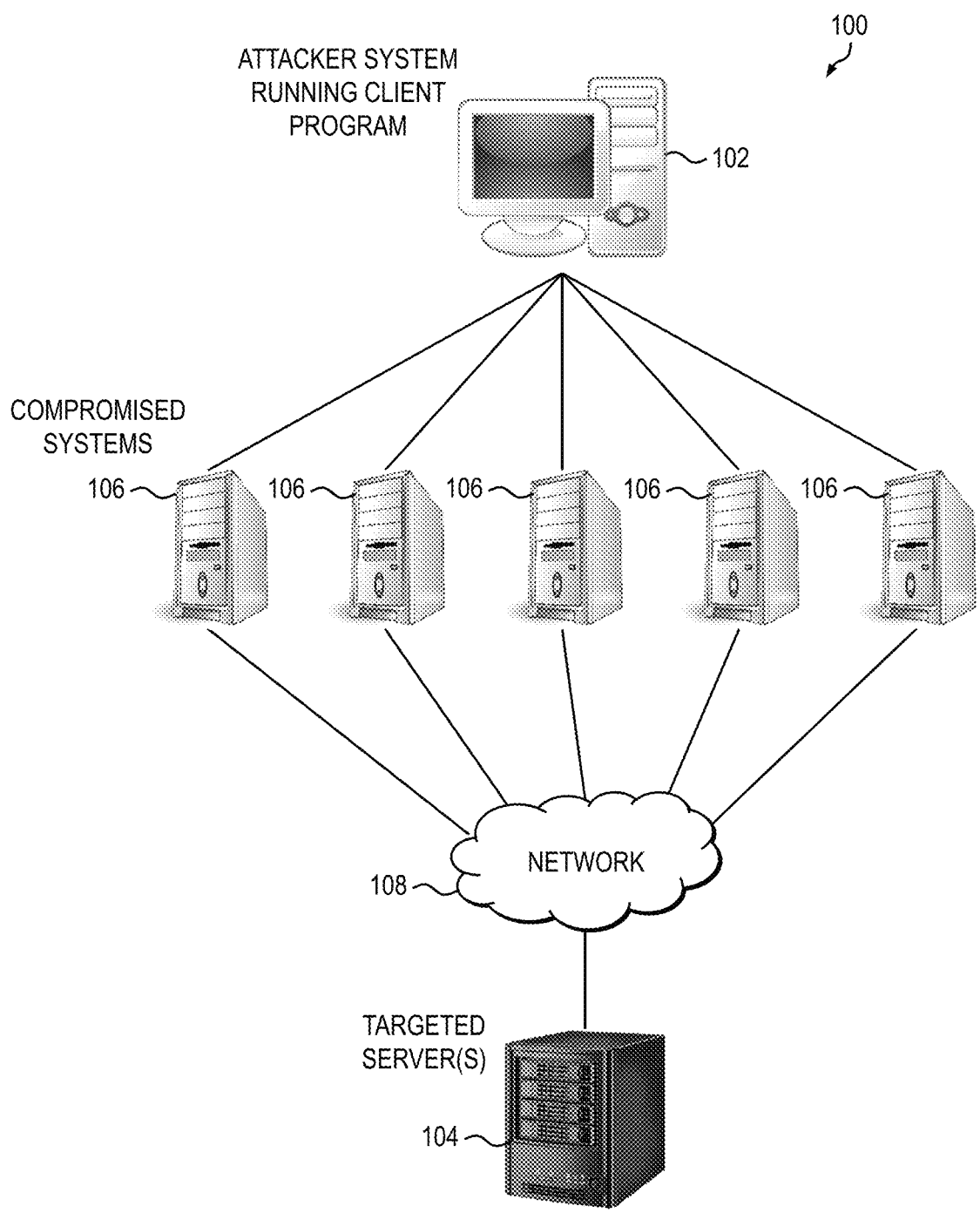
FIG. 1 is a block diagram conceptually depicting the occurrence of a distributed denial-of-service (DDoS) attack in an exemplary networked computing system.

FIG. 1 is a block diagram conceptually depicting the occurrence of a DDoS attack in an exemplary networked computing system 100. In a typical DDoS attack, an attacker system 102 running a client program seeks to make a targeted system 104, often one or more Web servers, unavailable to its intended users. Denial of service is typically accomplished by the attacker system 102 flooding the targeted system 104 with superfluous requests or other malicious traffic via multiple compromised computer systems 106 connected with the targeted system in a distributed manner through a network 108, such as the Internet. The incoming traffic flooding the targeted system 104 in a DDoS attack originates from many different sources (e.g., compromised systems 106), thereby making it effectively impossible to stop the attack simply by blocking a single source.

The terms "network traffic," or "data traffic," or simply "traffic" as used herein are intended to broadly refer to the amount of data moving across a network at a given point in time. From a computing standpoint, network data in computer networks is most typically encapsulated in data packets, which provide the load in the network.

Currently, detection of DDoS attacks is based on the volume of traffic and not the source of the traffic. For example, a standard DDoS detection scheme may involve inspecting the volume of data packets sent to a certain customer from all sources under "normal" conditions to establish a baseline traffic level, and if there is a large increase in the volume of traffic compared to the established baseline level, a DDoS attack is suspected. Various parameters may be used to determine whether a threshold level of traffic has been exceeded, such as, but not limited to, evaluating total User Datagram Protocol (UDP) traffic, total Domain Name System (DNS) traffic, various protocols commonly used for DDoS attacks, etc. One problem with this volume-based approach is that it often generates false positives, particularly for applications utilizing a high volume of legitimate traffic (e.g., customers streaming Netflix or Google).

When the volume of detected traffic exceeds some threshold, either a prescribed value or based on one or more algorithms or software, some action is taken which may be in the form of, for instance, triggering an alert or blocking what is believed to be the attacking traffic. Current DDoS attack mitigation may involve, for example, broad packet-filtering, throttling or rate-limiting the traffic to alleviate what is presumed to be a DDoS attack, when in reality the traffic may be attributable to valid users. Employing these measures, however, simply facilitates the attacker's desired objective by shutting down the system, causing denial of service to legitimate users.

Embodiments of the invention, according to aspects thereof, beneficially provide apparatus and/or methods for detecting and mitigating the threat of DDoS attacks by using, at least in part, an Autonomous System Number (ASN) for identifying the source of a malicious attack. An ASN is a special number assigned by the Internet Assigned Numbers Authority (IANA), used primarily with Border Gateway Protocol (BGP), which uniquely identifies a network under a single technical administration that has a unique routing policy, or is multi-homed to the public internet. In one or more embodiments, ASNs are used in conjunction with at least one other criteria, such as, for example, the volume of traffic, and some sort of weighting or whitelisting (i.e., listing or registering of entities that are being provided a particular privilege, service, mobility, access or recognition) is used for various source ASN traffic. So if, by way of example only and without limitation, traffic is identified as originating from Netflix or Google, it is unlikely that these IP sources are generating a DDoS attack; rather, traffic coming from these known sources would be considered valid traffic and thus will not trigger a DDoS mitigation response. This approach would advantageously improve the protection mechanism.

Figure 2:
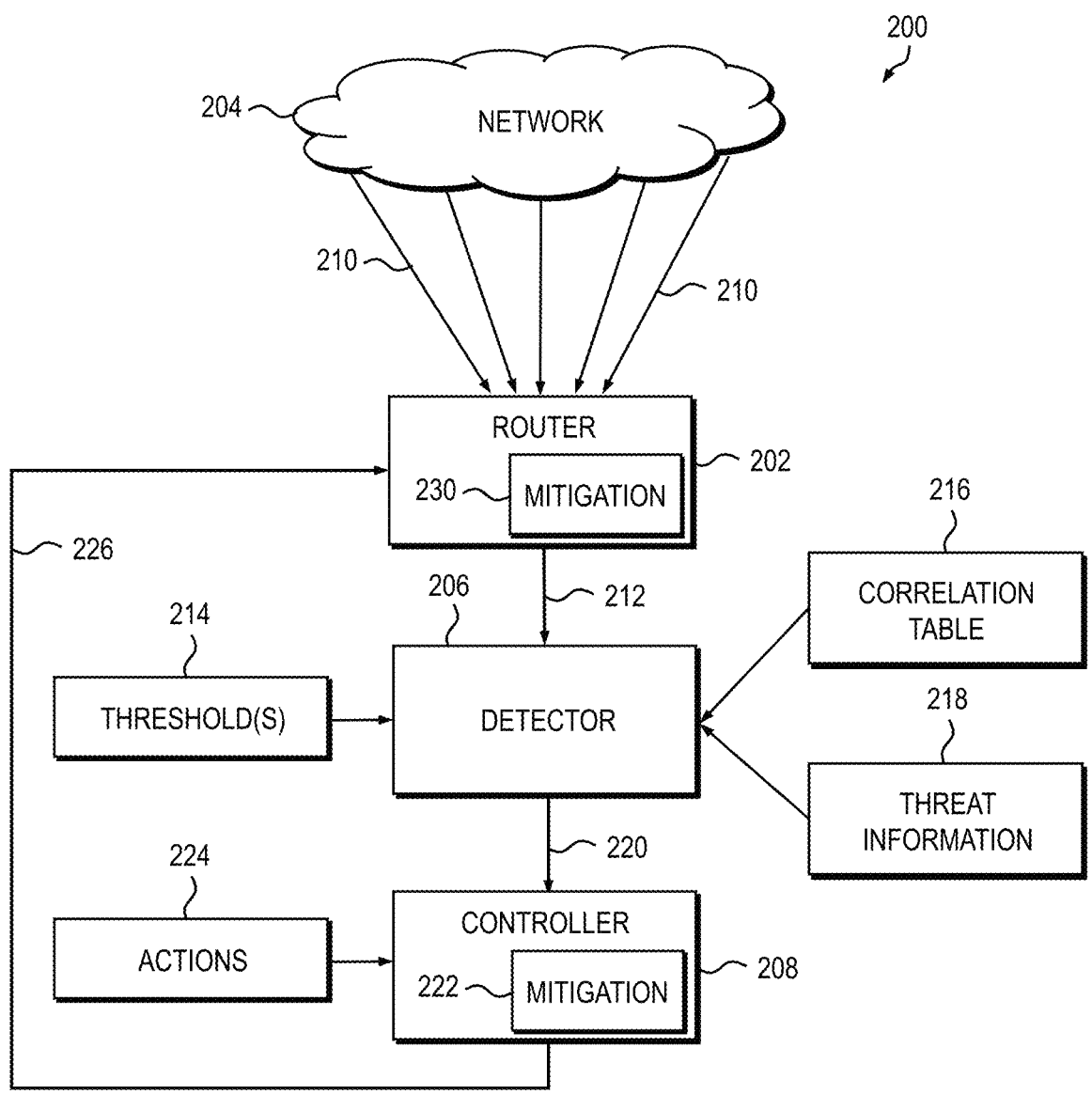
FIG. 2 is a block diagram depicting at least a portion of an exemplary apparatus for detecting and mitigating DDoS attacks in a networked computing system, according to an embodiment of the present invention.

FIG. 2 is a block diagram depicting at least a portion of an exemplary apparatus 200 for detecting and mitigating DDoS attacks in a networked computing system, according to an embodiment of the invention. As shown in FIG. 2, the DDoS detection and mitigation apparatus 200 includes at least one router 202 operatively coupled with a network 204 (e.g., the Internet), a detector 206 operatively coupled with the router 202, and a controller 208 operatively coupled with the detector 206 and, optionally, the router 202.

The router 202 is configured to receive requests 210 or other traffic from the network 204 with which the router is operatively coupled (e.g., in wired or wireless communication therewith). In one or more embodiments, the router 202 is configured to characterize network operation by collecting IP network traffic flow information as the traffic enters or exits an interface or network node, such as, for example, using NetFlow (a product of Cisco Systems, Inc.) or the like. By analyzing the data provided by NetFlow, a network administrator can determine information relating to the operational status of the network, such as, but not limited to, the source and destination of traffic, class of service, and the causes of congestion. In order to characterize network operation, the router 202, in one or more embodiments, is configured to aggregate packets into flows and to export flow records, to receive, store and pre-process the flow records, and to analyze the received flow data in the context of intrusion detection and/or traffic profiling, for example. A least a subset of the network traffic flow information 212 is then passed to the detector 206 where the traffic flow is monitored for the presence of a possible DDoS attack condition.

In detecting the presence of a potential DDoS attack, the detector 206, in one or more embodiments, is configured to monitor the volume of packets received from the router 202. The detector 206 utilizes one or more thresholds 214, which may be stored either internally or may reside externally to the detector. The thresholds 214 may be based on a prescribed value, on one or more algorithms or software (e.g., modeling a behavior and/or operational status of the network), or some combination thereof, according to one or more embodiments; the thresholds 214 may be fixed or dynamic. Various parameters may be used to determine whether a threshold level of traffic has been exceeded, including, but not limited to, evaluating total UDP traffic, total DNS traffic, various protocols commonly used for DDoS attacks, etc.

Once the detector 206 receives a large volume of traffic and determines that a threshold level of traffic has been exceeded (e.g., based, at least in part, on thresholds 214), rather than immediately generating an alert of a DDoS attack, the detector 206, in one or more embodiments, is configured to analyze the source IP addresses for the incoming traffic and determine what ASNs are associated with those source IP addresses. To accomplish this, the detector 206 is preferably configured to receive a correlation table 216, which may be stored internally or at least a portion may reside externally to the detector. The correlation table 216 provides a list of IP addresses and the ASNs associated with those IP addresses, such as in the form of a database look-up table or similar. The correlation table 216, in one or more embodiments, can be dynamically generated from a BGP session established between the detector 206 and the router 202; the ASN information associated with a given IP address is contained in the BGP routing information accessible to the router 202.

In order to determine whether a spike in received traffic volume is originating from a malicious source, and thus should be considered a DDoS attack, the detector 206, in one or more embodiments, is configured to receive prescribed threat information 218. The threat information 218 preferably comprises a risk level or weighting of risk associated with each ASN. This weighting is used by the detector 206 to determine a probability that the incoming traffic is originating from a malicious IP source. For example, the ASN of a known malicious source may be weighted high (e.g., 85%), indicating the likely presence of a DDoS attack, while the ASN of a known trusted IP source may be weighted low (e.g., 5%), indicating that the spike in volume is likely valid traffic. In one or more embodiments, the threat information 218 may be in the form of a whitelist of valid ASNs, a blacklist of malicious ASNs, etc. Preferably, the threat information 218 is updated periodically, for example automatically based on historical data or manually by a user, so that the threat information is kept current to adapt to changing threats. It is to be appreciated that embodiments of the invention are not limited to any specific form(s) of the threat information 218 used by the detector 206 in evaluating whether the spike in traffic flow is attributable to a malicious IP source.

After analyzing the traffic flow using, among other criteria, traffic volume, ASN information and risk level, the detector 206 will generate an output 220 indicative of a likelihood of a DDoS attack. This detector output 220 is provided to the controller 208 for determining a DDoS mitigation response (i.e., an action to be performed) based at least in part on the information conveyed in the detector output.

If traffic is determined to be originating from an IP source having a high risk associated therewith, as conveyed by the detector output 220, the controller 208 is configured to handle that traffic differently compared to normal (i.e., valid) traffic. For example, in one or more embodiments, the controller 208 is configured to divert the traffic originating from a high-risk IP source to a DDoS mitigation device 222, which may be a separate device or an application or module running on the controller 208 and/or router 202. DDoS mitigation actions which may be performed by the mitigation device 222 may include, but are not limited to, rate-limiting the traffic, discarding packets from the traffic, either randomly or in some defined manner, and/or performing deep packet inspection (DPI) on all or a subset of the packets constituting the malicious traffic flow.

The controller 208 may, in one or more embodiments, utilize information 224 associating specific ASNs with corresponding actions. The mitigation action(s) performed by the controller 208, via the mitigation device 222, will be based at least in part on this action information 224, which can be in the form of, for example, a database, table, whitelist, etc. Similarly, the action information 224, in one or more embodiments, may change dynamically based on a set of rules, or an algorithm or the like, rather than being merely fixed responses. Furthermore, the action information 224, in one or more embodiments, may be changed on the fly by a user so that the mitigation actions taken for corresponding ASNs can be updated as needed.

Even when the detector output 220 indicates that the traffic is originating from a trusted IP source, the controller 208 may be configured to log certain characteristics pertaining to the network operation, such as, for example, traffic volume, time/date, IP source ASN, etc., which can be optionally used by the network administration to optimize the performance of the network, but otherwise take no mitigation action.

Optionally, in one or more embodiments, the router 202 and controller 208 may be in communication with one another, such as via a connection 226 therebetween. The router 202 may include a mitigation device or module 230 which is configured to receive control signals from the controller 208 and to perform its own DDoS mitigation actions, either independently or in conjunction with mitigation actions taken by the controller 208. By way of example only and without limitation, the controller 208, based on the output 220 received from the detector 206, may determine that a DDoS attack is occurring and send a message or other control signal to the router 202 instructing the router to handle all traffic from a specified ASN differently from the normal IP traffic, including, but not limited to, rate-limiting the traffic, diverting the traffic to a different path (e.g., by changing the target IP address) for performing DPI or another analysis mechanism on the malicious traffic, discarding packets, etc. In this manner, traffic originating from the flagged IP source is disrupted while traffic originating from trusted IP sources is allowed to pass, thereby eliminating the DDoS attack without impacting legitimate users.

Figure 3:
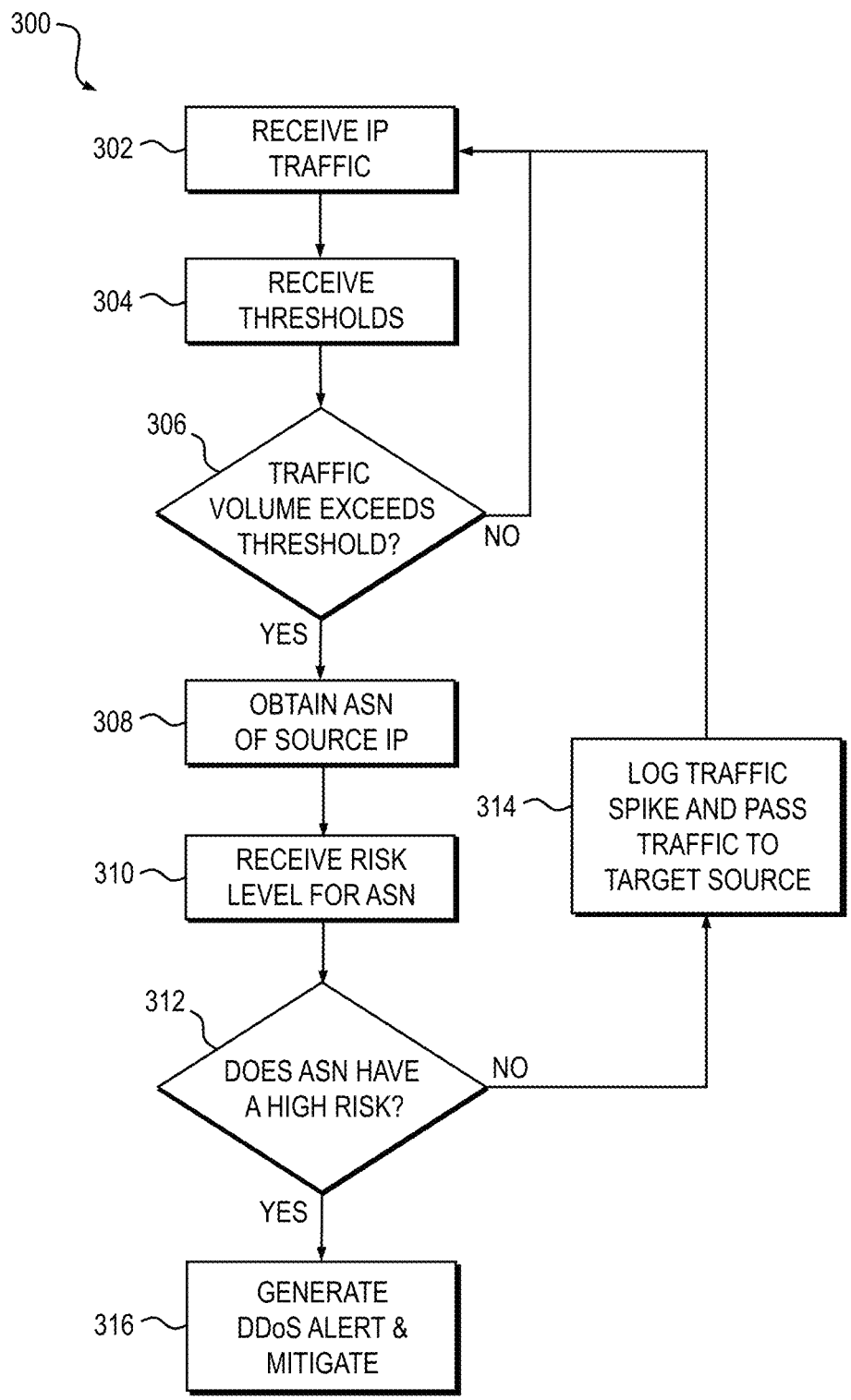
FIG. 3 is a flow diagram depicting an exemplary method for detecting and mitigating DDoS attacks using ASNs, according to an embodiment of the present invention.

FIG. 3 is a flow diagram depicting an exemplary method 300 for detecting and mitigating DDoS attacks using ASNs, according to an embodiment of the invention. At least a portion of the DDoS detection flow of the method 300 is preferably implemented in the detector 206, and at least a portion of the DDoS mitigation flow of the method is preferably implemented in the controller 208 of the illustrative apparatus 200 shown in FIG. 2, in one or more embodiments.

With continued reference to FIG. 3, in accordance with the method 300, the detector (e.g., detector 206 in FIG. 2) receives IP traffic from the router(s) (e.g., router 202 in FIG. 2) in step 302. In step 304, the detector receives threshold information indicating a level of traffic which is above an established baseline normal traffic level. This threshold information, or a portion thereof, may be obtained from a source external to the detector (e.g., external database, software module running a dynamic threshold calculation application, etc.) or at least a portion of the threshold information may be stored within the detector itself.

The volume of traffic received by the detector is then compared with the threshold information (e.g., using a comparator or other comparison mechanism) in step 306 to determine whether or not the volume of traffic flow exceeds the defined threshold. When the volume of traffic does not exceed the level defined by the threshold information, the detector continues to receive the IP traffic in a normal manner; that is, the method 300 reverts to step 302 and no further analysis of the traffic is required. When the volume of traffic exceeds the level defined by the threshold information, further analysis is required by the detector.

Specifically, the detector obtains the ASN associated with the source IP address in step 308. As previously stated, the ASN can be obtained, in one or more embodiments, from BGP session information dynamically generated by the router. This correlation between IP address and ASN is preferably stored, such as in a correlation table, database or the like, for use by the detector in step 308. In step 310, the router also receives risk information pertaining to each of at least a subset of the stored ASNs. This risk information may be in the form of a weighting, a probability of the source IP associated with the ASN being malicious, a whitelist of known valid sources, a blacklist of known malicious sources, etc.

In step 312, the ASN associated with the flagged source IP is compared with the risk information for the corresponding ASN to determine whether the source IP is likely valid or malicious. When it is determined that the ASN has a low risk associated therewith, the traffic flow originating from that source IP is presumed to be valid and is therefore allowed to proceed to its target IP address in the normal manner. Optionally, in step 314, upon determining that the source IP is valid, the detector may initiate logging the occurrence of the spike in traffic volume and may also initiate logging one or more operating conditions of the network present at the time of the spike before passing the traffic to its intended destination, for example as specified by a destination IP address. Logging may be performed, according to embodiments of the invention, by the detector, controller or another module or device in operative communication with the detector or controller.

Alternatively, when it is determined in step 312 that the ASN has a high risk associated therewith indicating that the source IP is likely malicious, the detector generates an alert output in step 316 and triggers a mitigation device (e.g., device 222 in FIG. 2), through a controller (e.g., controller 208 in FIG. 2), to take one or more actions for mitigating the DDoS attack. Such actions may comprise, for example, rate-limiting the traffic from the flagged source IP address, discarding packets, diverting traffic flow to a specified IP address, performing DPI on the traffic flow, etc., as previously described. Prescribed mitigation actions performed by the mitigation device may be stored in a database, table, whitelist, etc., in one or more embodiments, and correlated to specific ASNs. In this manner, the mitigation action performed can be tailored to the corresponding ASN. Beneficially, changing the mitigation action to be performed for a given ASN can be easily accomplished by updating the correlation table (e.g., 224 in FIG. 2).

Figure 4:
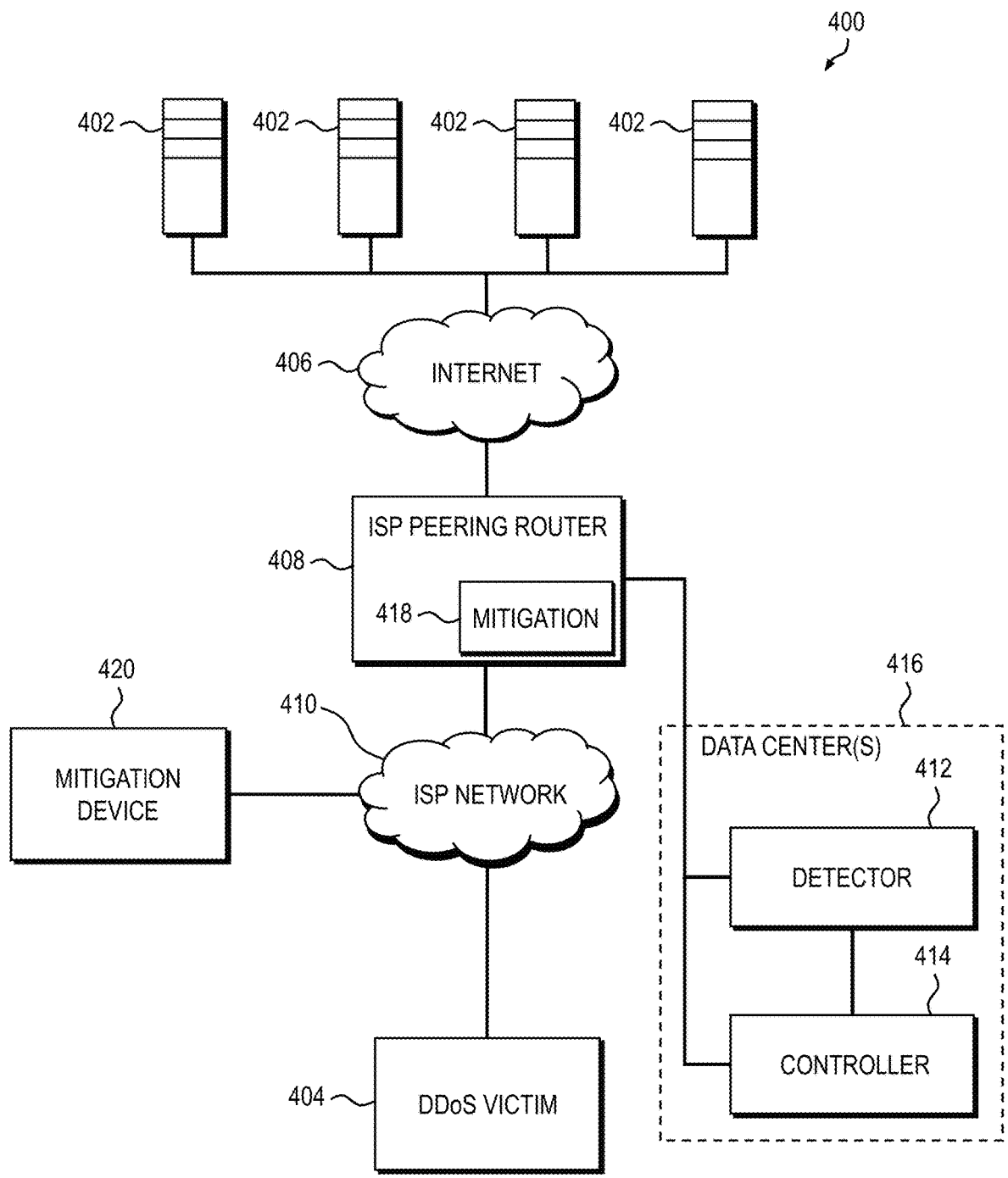
FIG. 4 is a block diagram depicting at least a portion of an exemplary networked computing system in which DDoS detection and/or mitigation techniques in accordance with one or more embodiments of the present invention are implemented.

FIG. 4 is a block diagram depicting at least a portion of an exemplary networked computing system 400 in which DDoS detection and/or mitigation techniques in accordance with one or more embodiments of the invention may be implemented. As shown in FIG. 4, the system 400 includes a plurality of attacker systems 402 operating in a distributed manner to flood (and thereby overwhelm) a targeted victim system 404 with superfluous requests or other malicious traffic through at least one network 406, such as the Internet. The superfluous traffic is channeled through a router 408, which may be an Internet Service Provider (ISP) peering router or the like. The term "peering" as used herein is intended to refer broadly to an arrangement of traffic exchange between two or more ISPs; larger ISPs (e.g., the Internet 406) with their own backbone networks agree to allow traffic from other large ISPs in exchange for traffic on their backbones. They also exchange traffic with smaller ISPs, such as, for example, ISP network 410, so that they can reach regional end points.

Peering requires the exchange and updating of router information between the peered ISPs, typically using BGP or another suitable communication protocol. Generally, peering parties interconnect at network focal points, such as, for example, network access points (NAPs) in the United States and at regional switching points. Each major ISP generally develops a peering policy that states the terms and conditions under which it will peer with other networks for various types of traffic.

The ISP peering router 408 may be implemented in a manner consistent with the illustrative router 202 previously described in conjunction with FIG. 2. In this embodiment, the peering router 408 is in operative communication with the ISP network 410. The peering router 408, in one or more embodiments, is configured to control traffic between the Internet 406 and the ISP network 410, generally via one or more BGP sessions (or suitable alternative communications protocols) established between the router and the Internet 406 and/or ISP network 410.

In a manner consistent with the illustrative embodiment shown in FIG. 2, the peering router 408 is operatively coupled with a detector 412, which may be implemented in a manner consistent with the illustrative detector 206 depicted in FIG. 2, and a controller 414, which may be implemented in a manner consistent with the illustrative controller 208 shown in FIG. 2. The detector 412 is also operatively coupled with the controller 414. At least portions of the detector 412 and the controller 414, in one or more embodiments, are incorporated within at least one data center 416 (e.g., a national data center (NDC) and/or a regional data center (RDC)) in communication with the peering router 408.

In this embodiment, like the exemplary embodiment of FIG. 2, in order to detect the presence of a potential DDoS attack, the detector 412 is configured to monitor the volume of packets received from the peering router 408. The detector 412 preferably utilizes one or more thresholds, which may be either stored internally or reside externally with respect to the detector. When the detector 412 determines that the level of traffic for a given target IP address exceeds some established value (e.g., fixed or dynamic), the detector, in one or more embodiments, is operative to analyze the source IP addresses for the incoming traffic and determine what ASNs are associated with those source IP addresses based at least in part on correlation information supplied to the detector (e.g., correlation table 216 in FIG. 2) which provides a list of IP addresses and the ASNs associated with those IP addresses. The ASN information associated with a given IP address may be obtained from the BGP routing information available from the router 408. After analyzing the traffic flow using traffic volume, ASN information and risk level, among other criteria, the detector 412 will generate an output indicative of a likelihood of a DDoS attack. This output is provided to the controller 414 for determining an appropriate DDoS mitigation course of action.

The controller 414 may incorporate a mitigation device or module therein, for example in a manner consistent with the mitigation device 222 shown in FIG. 2. Alternatively, the controller 414, in one or more embodiments, may be configured to generate a mitigation output signal (e.g., control and/or command signal) which is supplied to the peering router 408. The peering router 408 may include a first mitigation device 418 which is adapted to receive the output signal from the controller 414 and to perform one or more actions in response thereto for mitigating a DDoS attack. The mitigation device 418, similar to the mitigation device 222 previously described in conjunction with FIG. 2, may be a separate device or an application or module running on the peering router 408 itself. DDoS mitigation actions which may be performed by the mitigation device 418 may include, but are not limited to, rate-limiting the traffic, discarding packets from the traffic, either randomly or in some defined manner, and/or performing DPI on all or a subset of the packets constituting the malicious traffic flow.

In one or more embodiments, a second mitigation device 420 may be included which is operatively coupled with the ISP network 410. The second mitigation device 420, which may be in addition to or in place of the first mitigation device 418, is configured to receive one or more control signals from the controller 414, via the router 408, through the ISP network 410 for performing one or more DDoS mitigation actions in response thereto. For example, in one or more embodiments, the first mitigation device 418 in the peering router 408, in response to a DDoS attack mitigation request generated by the controller 414, may be configured to perform a first set of actions such as, but not limited to, rate-limiting the traffic or discarding packets from the traffic. The router 408 may redirect a flow of traffic identified as being malicious to the second mitigation device 420, with the second mitigation device being configured to perform DPI on all or a subset of the packets constituting the malicious traffic flow.

The controller 414, in one or more embodiments, may utilize information (e.g., information 224 in FIG. 2) associating a specific ASN with one or more corresponding actions. The mitigation action(s) performed by the controller 414, via the first and/or second mitigation devices 418 and 420, respectively, may be based at least in part on this action information, which can be in the form of a database, table, whitelist, etc., as previously stated. Similarly, the action information, in one or more embodiments, may change dynamically based on a set of rules, or an algorithm or the like, rather than being fixed responses.

The peering router 408, upon determining that the incoming traffic flow is valid, will allow the traffic flow to pass to the intended target device 404 essentially without being impacted by any DDoS mitigation actions. In one or more embodiments, when the level of traffic flow exceeds the prescribed threshold value but the detector output indicates that the traffic is originating from a trusted IP source, the first and/or second mitigation devices 418, 420 may be instructed by the controller 414 to log the occurrence of the spike in traffic and certain characteristics pertaining to the network operational status, such as, for example, traffic volume, time, IP source ASN, etc., which can be optionally used by one or more components in the network 400 to optimize the performance of the network, but otherwise take no mitigation action to impede the flow of traffic.

Given the discussion thus far, it will be appreciated that, in general terms, an exemplary apparatus for detecting a DDoS attack in a networked computing system, according to an aspect of the invention, includes at least one detector in operative communication with a corresponding router in the networked computing system. The detector is configured: to receive data packets from the router; to compare a volume of the data packets received by the detector with a threshold value; to obtain an ASN associated with a source IP address of the received data packets when the volume of the data packets exceeds the threshold value; and to generate an output signal indicative of a probability of a presence of a DDoS attack based at least in part on threat information corresponding to the ASN associated with the source IP address of the received data packets.

Given the discussion thus far, it will be appreciated that, in general terms, an exemplary method of detecting a DDoS attack in a networked computing system, according to an aspect of the invention, includes: receiving data packets from a router in the networked computing system, each of the data packets having a source IP address associated therewith; comparing a volume of the received data packets against a threshold value to determine whether the volume of the received data packets exceeds the threshold value; obtaining an ASN associated with the source IP address of the received data packets when the volume of the received data packets exceeds the threshold value; and generating an output signal indicative of a probability of a presence of a DDoS attack based at least in part on threat information corresponding to the ASN associated with the source IP address of the received data packets.

Given the discussion thus far, it will be further appreciated that, in general terms, an exemplary non-transitory computer readable medium includes computer executable instructions which when executed by a computer cause the computer to perform a method of: receiving data packets from a router in a networked computing system, each of the data packets having a source IP address associated therewith; comparing a volume of the received data packets against a threshold value to determine whether the volume of the received data packets exceeds the threshold value; obtaining an ASN associated with the source IP address of the received data packets when the volume of the received data packets exceeds the threshold value; and generating an output signal indicative of a probability of a presence of a distributed denial of service attack based at least in part on threat information corresponding to the ASN associated with the source IP address of the received data packets.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 5:
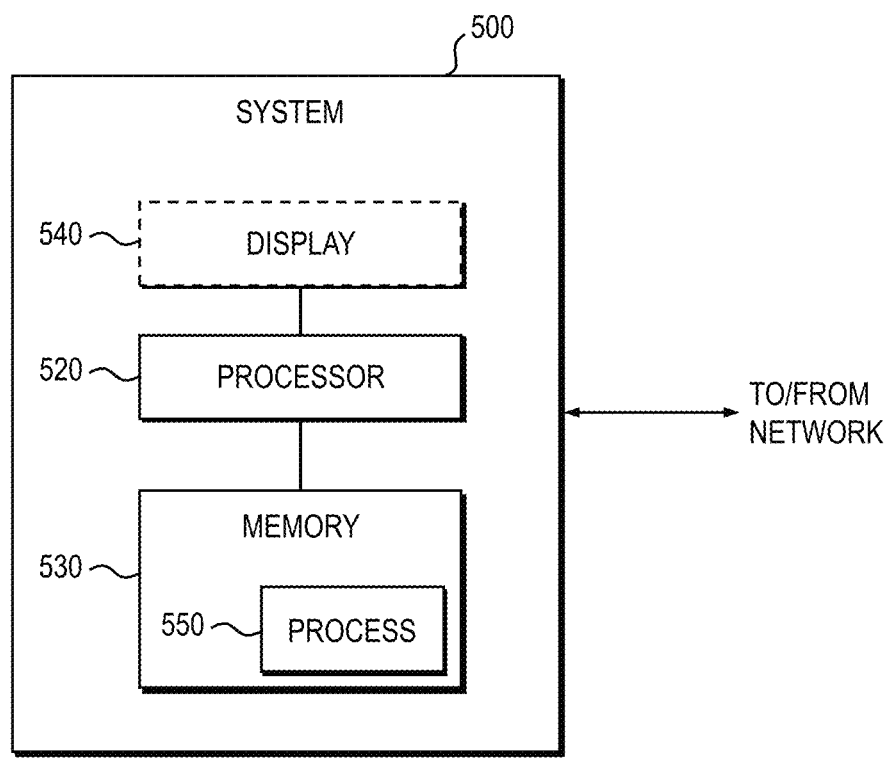
FIG. 5 is a block diagram of at least a portion of an exemplary system that can be configured to implement at least some aspects of the invention, according to one or more embodiments of the present invention.

FIG. 5 is a block diagram of at least a portion of an exemplary system 500 that can be configured to implement at least some aspects of the invention, and is representative, for example, of one or more of the apparatus or modules shown in the figures. As shown in FIG. 5, memory 530 configures the processor 520 to implement one or more methods, steps, and functions (collectively, shown as process 550 in FIG. 5). The memory 530 could be distributed or local and the processor 520 could be distributed or singular. Different steps could be carried out by different processors, either concurrently (i.e., in parallel) or sequentially (i.e., in series).

The memory 530 could be implemented as an electrical, magnetic or optical memory, or any combination of these or other types of storage devices. It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an ASIC rather than using firmware—an ASIC chip could be used to initiate the fusible link blowout. Display 540 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus for detecting a distributed denial-of-service (DDoS) attack in a networked computing system, the apparatus comprising:
   at least one detector in operative communication with a corresponding router in the networked computing system, the at least one detector being configured: to receive data packets from the router; to compare a volume of the data packets received by the detector with a threshold value; to obtain an Autonomous System Number (ASN) associated with a source Internet Protocol (IP) address of the received data packets when the volume of the data packets exceeds the threshold value, the ASN having an assigned probability number, the assigned probability number indicating a percentage probability of a presence of a DDoS attack; and to generate an output signal indicating a likelihood that the ASN associated with the source IP address of the received data packets is associated with the DDoS attack identified by the volume of the data packets, wherein the at least one detector comprises a comparator adapted to generate a comparison output indicative of whether the volume of the data packets received by the detector exceeds the threshold value and wherein the threshold value is dynamically generated as a function of at least one of a behavior and an operational status of the networked computing system;
   wherein threat information comprises a weighting of risk associated with each ASN of a plurality of ASNs corresponding to source IP addresses of the received data packets, the at least one detector utilizing the weighting of risk associated with a given ASN to determine a probability that incoming data packets corresponding to the given ASN originate from a malicious source IP address.

2. The apparatus of claim 1, wherein determining whether the volume of the data packets received by the detector exceeds the threshold value comprises evaluating at least one of type of traffic and at least one protocol used for DDoS attacks.

3. The apparatus of claim 1, further comprising a correlation table in operative communication with the at least one detector, the correlation table providing a list of source IP addresses and ASNs associated with said source IP addresses, wherein the detector is adapted to obtain the ASN associated with the source IP address of the received data packets as a function of information contained in the correlation table.

4. The apparatus of claim 3, wherein the correlation table is dynamically generated from a Border Gateway Protocol (BGP) session established between the at least one detector and the corresponding router in the networked computing system, an ASN associated with a given source IP address being contained in BGP routing information accessible to the router.

5. The apparatus of claim 1, wherein the threat information comprises at least one of a whitelist of valid ASNs and a blacklist of malicious ASNs.

6. The apparatus of claim 1, wherein the at least one detector is adapted to receive the threat information, the threat information correlating a threat level with the ASN associated with the source IP address of the received data packets.

7. The apparatus of claim 6, wherein the threat level correlated with each ASN associated with source IP addresses of received data packets is automatically updated based on historical data available to the networked computing system.

8. The apparatus of claim 1, wherein the at least one detector is adapted to receive the threat information and to generate a status output indicative of whether the ASN associated with the source IP address of the received data packets has a risk level that exceeds a prescribed risk level, the status output being used by the at least one detector in generating the output signal.

9. The apparatus of claim 1, wherein the at least one detector is configured to at least one of initiate logging an occurrence of an increase in data traffic volume above an established baseline data traffic level and initiate logging of at least one operating condition of the networked computing system during the occurrence of the increase in traffic volume when the volume of the data packets exceeds the threshold value and the ASN associated with the source IP address of the received data packets corresponds to a valid source IP address.

10. The apparatus of claim 1, wherein the at least one detector is configured to forward the received data packets to an intended destination specified by a destination IP address associated with the received data packets.

11. The apparatus of claim 1, wherein the at least one detector is integrated within a data center of the networked computing system.

12. The apparatus of claim 1, further comprising at least one controller operatively coupled with the at least detector, the at least one controller being configured: to receive the output signal from the detector; and to generate a control signal adapted to initiate at least one action for mitigating the DDoS attack as a function of obtained action information.

13. A method of detecting a distributed denial-of-service (DDoS) attack in a networked computing system, the method comprising:
receiving data packets from a router in the networked computing system, each of the data packets having a source Internet Protocol (IP) address associated therewith;
dynamically generating a threshold value as a function of at least one of a behavior and an operational status of the networked computing system;
comparing a volume of the received data packets against the threshold value to determine whether the volume of the received data packets exceeds the threshold value;
obtaining an Autonomous System Number (ASN) associated with the source IP address of the received data packets when the volume of the received data packets exceeds the threshold value, the ASN having an assigned probability number, the assigned probability number indicating a percentage probability of a presence of a DDoS attack identified by the volume of the data packets; and
generating an output signal indicating a likelihood that the ASN associated with the source IP address of the received data packets is associated with the DDoS attack;
further comprising:
generating threat information by weighting a risk associated with each ASN of a plurality of ASNs corresponding to source IP addresses of the received data packets; and
utilizing the weighting of risk associated with a given ASN to determine a probability that incoming data packets corresponding to the given ASN originate from a malicious source IP address.

14. The method of claim 13, further comprising:
establishing a baseline level of data traffic for a given target IP address in the networked computing system; and
defining a prescribed level of data traffic above the baseline level of data traffic as the threshold value.

15. The method of claim 13, wherein determining whether the volume of the data packets received exceeds the threshold value comprises evaluating at least one type of traffic and at least one protocol used for DDoS attacks.

16. The method of claim 13, further comprising generating a correlation table, the correlation table providing a list of source IP addresses and ASNs associated with said source IP addresses, wherein obtaining the ASN associated with the source IP address of the received data packets is performed as a function of information contained in the correlation table.

17. The method of claim 16, wherein the correlation table is dynamically generated from a Border Gateway Protocol (BGP) session established between the router and at least one detector in the networked computing system, an ASN associated with a given source IP address being contained in BGP routing information accessible to the router.

18. The method of claim 13, wherein generating the output signal comprises:
correlating a threat level with the ASN associated with the source IP address of the received data packets to generate the threat information used to determine the probability of the presence of a DDoS attack; and
automatically updating the threat level based on historical data available to the networked computing system.

19. The method of claim 13, further comprising logging an occurrence of an increase in data traffic volume above an established baseline data traffic level and logging of at least one operating condition of the networked computing system during the occurrence of the increase in traffic volume when the volume of the data packets exceeds the threshold value and the ASN associated with the source IP address of the received data packets corresponds to a valid source IP address.

20. A non-transitory computer readable medium comprising computer executable instructions which when executed by a computer cause the computer to perform a method of:

receiving data packets from a router in a networked computing system, each of the data packets having a source Internet Protocol (IP) address associated therewith;

dynamically generating a threshold value as a function of at least one of a behavior and an operational status of the networked computing system;

comparing a volume of the received data packets against the threshold value to determine whether the volume of the received data packets exceeds the threshold value;

obtaining an Autonomous System Number (ASN) associated with the source IP address of the received data packets when the volume of the received data packets exceeds the threshold value, the ASN having an assigned probability number, the assigned probability number indicating a percentage probability of a presence of a distributed denial of service (DDoS) attack identified by the volume of the data packets;

generating an output signal indicating a likelihood that the ASN associated with the source IP address of the received data packets is associated with the distributed denial of service attack;

generating threat information by weighting a risk associated with each ASN of a plurality of ASNs corresponding to source IP addresses of the received data packets; and utilizing the weighting of risk associated with a given ASN to determine a probability that incoming data packets corresponding to the given ASN originate from a malicious source IP address.

\* \* \* \* \*